United States Patent
Kelly

(10) Patent No.: US 8,246,426 B1
(45) Date of Patent: Aug. 21, 2012

(54) HOG PADDLE AND METHOD OF MANUFACTURING THE SAME

(75) Inventor: Al Kelly, Lee's Summit, MO (US)

(73) Assignee: Hanna Acquisition Corporation, Kansas City, MO (US)

( * ) Notice: Subject to any disclaimer, the term of this patent is extended or adjusted under 35 U.S.C. 154(b) by 0 days.

(21) Appl. No.: 13/298,114

(22) Filed: Nov. 16, 2011

Related U.S. Application Data

(60) Provisional application No. 61/414,091, filed on Nov. 16, 2010.

(51) Int. Cl.
*A22B 5/08* (2006.01)
(52) U.S. Cl. .......................................................... 452/71
(58) Field of Classification Search .................... 452/71, 452/75, 82–85
See application file for complete search history.

(56) References Cited

U.S. PATENT DOCUMENTS

| 5,057,115 | A | * | 10/1991 | Dolev | 606/133 |
| 5,196,021 | A | * | 3/1993 | Kabla | 606/133 |
| 6,824,461 | B1 | * | 11/2004 | Dolev | 452/83 |

* cited by examiner

*Primary Examiner* — Richard Price, Jr.
(74) *Attorney, Agent, or Firm* — Kutak Rock LLP; Bryan P. Stanley; Marcellus A. Chase

(57) ABSTRACT

An animal carcass hair removal machine paddle is provided. The paddle includes a core of alternating layers of woven and non-woven fabrics. The core is pressed together and surrounded by an outer shell pressed onto the core. The layers of fabric are arranged with some shorter than the full length of the core such that one end of the core is thicker than the other end and the layers form a wave-like pattern when the core is pressed. In some embodiments, the weft or warp of the woven fabrics are arranged in special aligned and/or perpendicular arrangements.

28 Claims, 2 Drawing Sheets

HOG PADDLE AND METHOD OF MANUFACTURING THE SAME

CROSS-REFERENCE TO RELATED APPLICATIONS

This application claims priority pursuant to 35 U.S.C. 119(e) to U.S. Provisional Patent Application Ser. No. 61/414,091, filed Nov. 16, 2010, the entire disclosure of which is incorporated herein by reference.

FIELD

The present invention relates to equipment or machinery for processing animal carcasses. More particularly, the present invention relates to a paddle (or scraper) for use in hog or other animal carcass hair removal (dehairing) machinery and related methods of manufacture.

BACKGROUND

Hog carcass dehairing is typically accomplished through the use of a machine that includes multiple star wheels with paddles (or scrapers) attached to the ends (points) of the star wheels. The hog carcasses are moved through the machine past the star wheels which rotate the paddles against the carcasses to remove the hair. The paddles are flexible to prevent damage to the carcass, and include metal cleats or nails on the end opposing the connection to the star wheel to aid in grabbing and removing the hair from the carcasses.

The paddles of dehairing machines must properly balance the need to provide sufficient friction to remove the coarse, bristly hog hair, with the requirement to not damage the bones, pork or the hide of the carcass. Thus, paddles need to be sturdy and stiff, but yet also have flexibility. Numerous materials and paddle designs of the prior art have been used to achieve the above-referenced balance. Many conventional paddles are constructed of layers of nylon or other fabric that are laminated together. Nevertheless, prior art paddles break apart (or delaminate) fairly rapidly in the harsh, high temperature (roughly 190 degrees), wet (from steam and/or hot water), environment inside dehairing machines. Water or moisture gets between the layers, and the high temperature and constant flexing stress on the paddles causes the layers to quickly delaminate.

Rapid break-down means frequent stoppage of the line. Replacing broken paddles is a dirty, nasty and time-consuming job exposing workers to unpleasant and potentially dangerous environments inside the machine. In addition, when a paddle breaks apart or delaminates during operation of the machine, debris from the paddle can contaminate the carcasses being dehaired in the machine. Prior art solutions to increase paddle life include adding a brace or backer to paddles. Such paddle backers, while increasing strength, also reduce flexibility of the paddles, and also increase costs significantly. Therefore, it would be beneficial to provide a paddle that is flexible, but that does not break down as rapidly as those of the prior art. It would also be beneficial to provide a paddle that provides reduced risk of contamination when the paddle fails/breaks apart.

The general inventive concept provides a solution to these and other disadvantages of the current state-of-the-art.

SUMMARY

The inventive concept provides a paddle that is flexible and more durable (i.e., lasts longer) than conventional paddles. The inventive concept further provides a paddle that reduces the risk of contamination when a paddle fails/breaks apart.

An animal carcass hair removal machine paddle is provided. The paddle includes a core of alternating layers of woven and non-woven fabrics. The core is pressed together and surrounded by an outer shell. The layers of fabric are arranged such that after the core is pressed together and before the outer shell is pressed onto the core, one end of the core is thicker than the other end. After the outer shell is pressed onto the core, one end of the paddle has holes drilled so that it can be affixed to an end point of a star wheel. The other end of the paddle also has holes drilled into it so that one or more metal cleats can be affixed to it.

In one aspect, some layers of woven fabric are arranged with their weft (a/k/a fill) or warp in a first direction while other layers of woven fabric are arranged with their respective weft or warp in a second direction (e.g. the patterns of two or more layers crisscross each other and/or are offset to one another). In some embodiments, the layers are arranged such that the direction of the weft or warp is different than the direction of the weft or warp of an adjacent layer of woven fabric. In some embodiments, the layers are arranged such that the direction of the weft or warp is aligned with the direction of the weft or warp of a non-adjacent layer of woven fabric. In some embodiments, the two directions of weft/warp of adjacent layers of woven fabric are perpendicular to one another.

In some embodiments, several layers of non-woven fabric are formed from a single, continuous sheet of non-woven fabric folded back over itself with a layer of woven fabric situated between each layer of folded non-woven fabric. In some embodiments, some layers extend or span less than the full distance from one end of the core to the opposite end of the core. In some embodiments, one of the layers that extends less than the full distance of the core lies between one adjacent layer that is shorter and a second adjacent layer that is longer. Thus, the lengths of at least some of the layers gradually increase, forming a stair step arrangement. In some embodiments, when the core is pressed together, the layers form a wave-like pattern.

The foregoing and other objects are intended to be illustrative of the invention and are not meant in a limiting sense. Many possible embodiments of the invention may be made and will be readily evident upon a study of the following specification and accompanying drawings comprising a part thereof. Various features and subcombinations of invention may be employed without reference to other features and subcombinations. Other objects and advantages of this invention will become apparent from the following description taken in connection with the accompanying drawings, wherein is set forth by way of illustration and example, an embodiment of this invention.

DESCRIPTION OF THE DRAWINGS

These and/or other aspects and utilities of the present general inventive concept will become apparent and more readily appreciated from the following description of the embodiments, taken in conjunction with the accompanying drawings. For the purpose of illustration, forms of the present general inventive concept which are presently preferred are shown in the drawings; it being understood, however, that the general inventive concept is not limited to the precise arrangements and instrumentalities shown. In the drawings.

DETAILED DESCRIPTION

Figure 1:
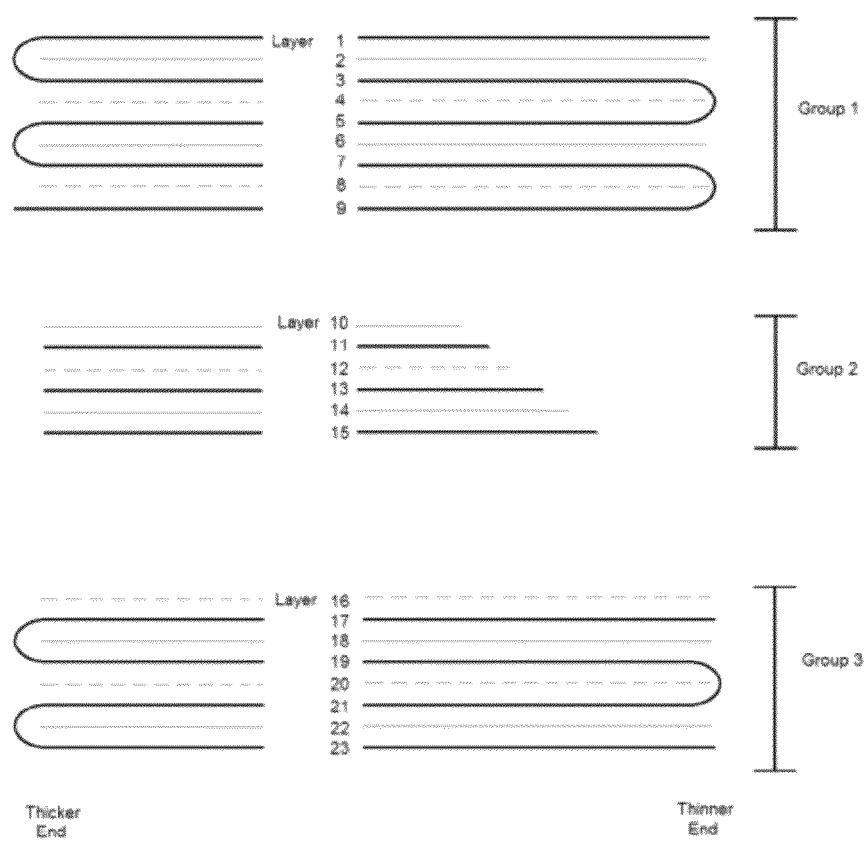
FIG. 1 is an exploded cross-sectional schematic of a multi-layered core of a paddle of an embodiment of the present general inventive concept.

The present general inventive concept provides a paddle that is flexible and more durable (i.e., lasts longer) than conventional paddles. It provides a paddle that reduces the risk of contamination when a paddle fails/breaks apart. The present general inventive concept includes a core of multiple layers of alternating woven and non-woven fabrics. The multi-layered core is surrounded by an outer shell. In some embodiments, one or more layers of the core extend less than the full length of the core such that one end of the paddle is thicker than the opposite end. In some embodiments, the multi-layered core is arranged and pressed together in such a manner as to create a wave-like pattern in a cross-section of the length of the core layers, thus providing additional flexibility or give. In some embodiments, the paddle includes metal cleats at one end, preferably the thinner end. In some embodiments, the thicker end of the paddle is configured such that it can be connected to a star wheel, for example with a pair of bolt holes on the thicker end of the paddle.

The core of the paddle includes alternating layers of woven and non-woven fabrics. In some embodiments, a single, continuous sheet of non-woven fabric is folded back upon itself to form multiple layers of non-woven fabric, with a layer of woven fabric in between each layer of non-woven fabric.

Each of the woven fabric layers have a warp and weft. In some embodiments, the warp of one of the woven fabric layers is aligned with the warp of another one of the woven fabric layers. In some embodiments, the weft of one of the woven fabric layers is aligned with the weft of another one of the woven fabric layers. In some embodiments, the warp of one of the woven fabric layers is out of alignment with the warp of another one of the woven fabric layers. In some embodiments, the weft of one of the woven fabric layers is out of alignment with the weft of another one of the woven fabric layers. In some embodiments, the warp of one of the woven fabric layers is crisscrossed with (i.e., perpendicular to) the warp of another one of the woven fabric layers. In some embodiments, the weft of one of the woven fabric layers is crisscrossed with (i.e., perpendicular to) the weft of another one of the woven fabric layers. In some embodiments, the warp of one of the woven fabric layers is crisscrossed with (i.e., perpendicular to) the warp of an adjacent one of the woven fabric layers. In some embodiments, the weft of one of the woven fabric layers is crisscrossed with (i.e., perpendicular to) the weft of an adjacent one of the woven fabric layers. In some embodiments, the warp of one of the woven fabric layers is crisscrossed with (i.e., perpendicular to) the warp of an adjacent one of the woven fabric layers and aligned with the warp of another one of the woven fabric layers. In some embodiments, the weft of one of the woven fabric layers is crisscrossed with (i.e., perpendicular to) the weft of an adjacent one of the woven fabric layers and aligned with the weft of another one of the woven fabric layers. In some embodiments, one or more of the layers of woven fabric are cut on the bias of the fabric (i.e. at an angle of the fabric pattern). In other words, the woven fabric is cut such that the warp and/or weft bias the fabric in a first direction and the bias of the warp and/or weft of the alternating layers of woven fabric is arranged in different directions, preferably in opposing, perpendicular, or counter-balancing directions.

Referring to FIG. 1, a cross-sectional schematic (not-to-scale) of the core of a layered paddle of an embodiment of the instant invention is shown. The core is made of alternating layers of woven and non-woven fabric. In the embodiment shown in FIG. 1, the woven fabric is 1260/0.53 mm and the non-woven fabric is 840/0.3 mm. In the embodiment shown in FIG. 1, the odd numbered layers (i.e., 1, 3, 5, 7, 9, through 23) are non-woven fabric and the even numbered layers (i.e., 2, 4, 6, 8, 10, through 22) are woven fabric. The layers of the paddle core shown in FIG. 1 may be divided into three groups, generally. The three groups of layers of the paddles are shown as Group 1, Group 2, and Group 3 in FIG. 1. The three Groups of layers are pressed together and sealed within an outer shell (not shown). When the three Groups are pressed together, the core of the paddle will be thicker at one end and thinner at the opposite end. The thicker end is configured to be attached to a star wheel and the thinner end is configured to have metal cleats attached.

The Group 1 layers of FIG. 1 include nine layers of alternating woven and non-woven fabric (i.e., layers 1-9). The odd numbered layers (i.e., layers 1, 3, 5, 7, and 9) are non-woven fabric. The even numbered layers (i.e., layers 2, 4, 6, and 8) are woven fabric.

The Group 1 layers of FIG. 1 are created by alternating layers of non-woven fabric (the odd numbered layers) and layers of woven fabric (the even numbered layers). The non-woven fabric layers are created by taking one long continuous sheet of non-woven fabric and folding it back over itself lengthwise several times, with a layer of woven fabric placed in the fold, between each layer of folded non-woven fabric. Thus, layer 7 (non-woven fabric) is a continuous sheet with, and folded back on top of, layer 9 (non-woven fabric) and layer 8 (woven fabric) is placed in between layers 7 and 9. Similarly, layer 5 (non-woven fabric) is a continuous sheet with, and folded back on top of, layer 7 (non-woven fabric) and layer 6 (woven fabric) is placed in between layers 5 and 7. Layer 3 (non-woven fabric) is a continuous sheet with, and folded back on top of, layer 5 (non-woven fabric) and layer 4 (woven fabric) is placed in between layers 3 and 5. Finally, layer 1 (non-woven fabric) is a continuous sheet with, and folded back on top of, layer 3 (non-woven fabric) and layer 2 (woven fabric) is placed in between layers 1 and 3.

Referring to the Group 1 layers of FIG. 1, the warp and weft of the woven fabric of layers 2 and 6 are aligned with one another. The warp and weft of the woven fabric of layers 4 and 8 are also aligned with one another. The warp and weft of the woven fabric of layers 2 and 6 are crisscrossed with (i.e., perpendicular to) the warp and weft of the woven fabric of layers 4 and 8.

The Group 3 layers of FIG. 1 are arranged similarly to the Group 1 layers. Group 3 includes eight layers of alternating woven and non-woven fabric (i.e., layers 16-23). The odd numbered layers (i.e., layers 17, 19, 21, and 23) are non-woven fabric. The even numbered layers (i.e., layers 16, 18, 20, and 22) are woven fabric.

Similar to the Group 1 layers, the Group 3 layers of FIG. 1 are created by alternating layers of non-woven fabric (the odd numbered layers) and layers of woven fabric (the even numbered layers). The non-woven fabric layers are created by taking one long continuous sheet of non-woven fabric and folding it back over itself lengthwise several times, with a layer of woven fabric placed in the fold, between each layer of folded non-woven fabric. Thus, layer 21 (non-woven fabric) is a continuous sheet with, and folded back on top of, layer 23 (non-woven fabric) and layer 22 (woven fabric) is placed in between layers 21 and 23. Layer 19 (non-woven fabric) is a continuous sheet with, and folded back on top of, layer 21 (non-woven fabric) and layer 20 (woven fabric) is placed in between layers 19 and 21. Layer 17 (non-woven fabric) is a continuous sheet with, and folded back on top of, layer 19 (non-woven fabric) and layer 18 (woven fabric) is placed in between layers 17 and 19. Finally, layer 16 (woven fabric) is placed on top of layer 17, and will eventually end up between layer 17 and 15 (Group 2), when the three Groups are pressed together.

Referring to the Group 3 layers of FIG. 1, the warp and weft of the woven fabric of layers 16 and 20 are aligned with one another. The warp and weft of the woven fabric of layers 18 and 22 are also aligned with one another. The warp and weft of the woven fabric of layers 16 and 20 are crisscrossed with (i.e., perpendicular to) the warp and weft of the woven fabric of layers 18 and 22.

The Group 2 layers of FIG. 1 include six layers of alternating woven and non-woven fabric (i.e., layers 10-15). The odd numbered layers (i.e., layers 11, 13, and 15) are non-woven fabric. The even numbered layers (i.e., layers 10, 12, and 14) are woven fabric.

The Group 2 layers of FIG. 1 are created by alternating layers of non-woven fabric (the odd numbered layers) and layers of woven fabric (the even numbered layers). The non-woven fabric layers of Group 2 are not one long continuous sheet of non-woven fabric folded back over itself lengthwise several times. Instead, each layer of Group 2 is separate from every other Group 2 layer. As shown in Group 2 of FIG. 1, all of the Group 2 layers extend less than the full length from the thicker end of the core to the thinner end of the core. Layer 15 (non-woven) is the longest of the Group 2 layers. Layer 14 (woven) is shorter than layer 15 (non-woven) and longer than layer 13 (non-woven). Layer 13 (non-woven) is shorter than layer 14 (woven) and longer than layer 12 (woven). Layer 12 (woven) is shorter than layer 13 (non-woven) and longer than layer 11 (non-woven). Layer 11 (non-woven) is shorter than layer 12 (woven) and longer than layer 10 (woven). Layer 10 (woven) is the shortest of the Group 2 layers.

In some embodiments, each of the Group 2 layers is shorter than the length of the paddle, to provide an increased thickness at the end of the paddle that is attached to the star wheel. In the embodiment shown in FIG. 2, the second group of layers is roughly ⅓ the length of the paddle. Nevertheless, it will be appreciated that other lengths may be used without departing from the spirit and scope of the instant invention. In the embodiment shown in FIG. 2, the lengths of layers 10 through 15 gradually increase in length from layer 10 to layer 15 to provide a ramp-like or tapered intersection and better lamination between the first and third groups of layers.

Referring to the Group 2 layers of FIG. 1, the warp and weft of the woven fabric of layers 10 and 14 are aligned with one another. The warp and weft of the woven fabric of layers 10 and 14 are crisscrossed with (i.e., perpendicular to) the warp and weft of the woven fabric of layer 12.

As shown in FIG. 1, when the three Groups are pressed together, the warp and weft of layers 2, 6, 10, 14, 18, and 22 are aligned with one another. The warp and weft of layers 4, 8, 12, 16, and 20 are aligned with one another. The warp and weft of the woven fabric of layers 2, 6, 10, 14, 18, and 22 are crisscrossed with (i.e., perpendicular to) the warp and weft of the woven fabric of layers 4, 8, 12, 16, and 20.

The three Groups are stacked together as shown and in FIG. 1 in a mold cavity. In a preferred embodiment 2 to 4 cavities are used in one mold to press, respectively, 2 to 4 individual paddles at one time. In some embodiments, the mold is placed in a 200 ton press for best compression of the layers. In some embodiments, compression is maintained on the mold for a period of 40 minutes at a temperature of 170 degrees Celsius to allow the molded paddles to cure.

Figure 2:
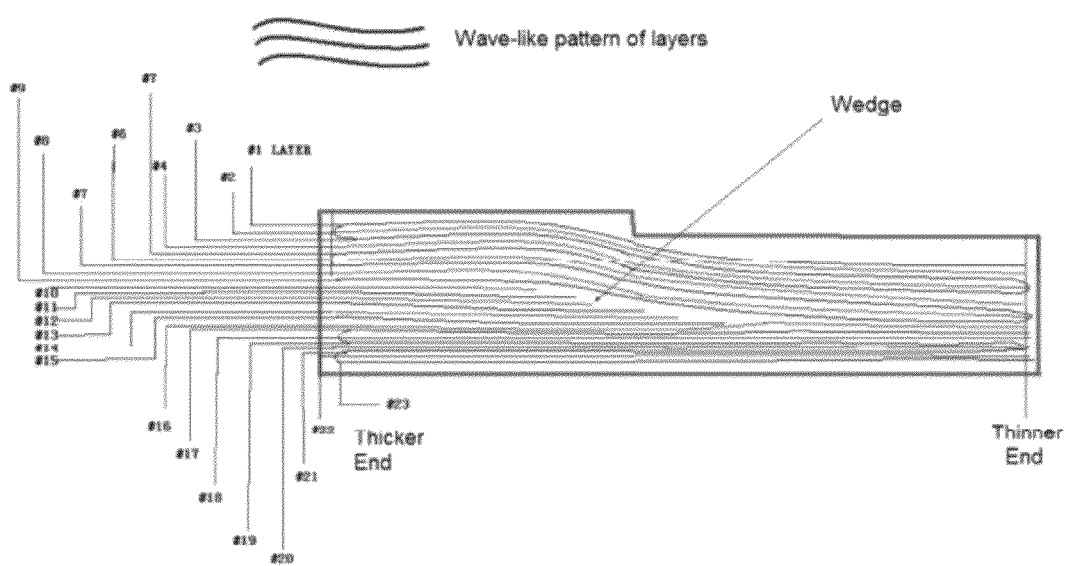
FIG. 2 is a color cross-sectional schematic of a layered core and outer shell of a paddle of an embodiment of the present general inventive concept.

The three groups or bundles of layers are stacked on top of each other as shown in FIG. 2, and then an outer layer of rubber is wrapped (much like a tortilla) around the bundles to surround all edges of the stacks of bundles and form the outer surface of the paddle. The fabric of the bundles is etched (chemically treated) to allow the rubber layer to vulcanize to the fabric. The rubber layer is wrapped around the bundles, with the edges of the rubber folded over each other like a tortilla wrap, so that the bundles are entirely enclosed in the rubber outer shell. After the rubber is wrapped around the bundles, the entire assembly (fabric bundles wrapped in rubber outer shell) is placed in the mold described above and pressed. The press causes the folded portions of the rubber layer generally to conform around the bundles of fabric resulting in a generally uniform thickness of rubber encasing the entire final product. Excess rubber, or flash, that flows out between the cavities of the mold is trimmed to provide a more aesthetic and generally continuous appearance to the outer surface of the final product.

In one preferred embodiment, the rubber outer layer is SBR, 2 mm. The rubber outer layer of the instant invention provides a barrier to prevent moisture from entering between layers of fabric. In addition, due to the unique weave and assembly technique of the instant invention, when a paddle breaks, it does so generally cleanly compared to the prior art, without multiple pieces contaminating the carcasses being dehaired.

Thus, while the present general inventive concept has been shown in the drawings and fully described above with particularity and detail in connection with what is presently deemed to be the most practical and preferred embodiment(s) of the invention, it will be apparent to those of ordinary skill in the art that many modifications thereof may be made without departing from the principles and concepts set forth herein, including, but not limited to, variations in size, materials, shape, form, function and manner of operation, assembly and use; applications in contexts outside animal carcass de-hairing machinery; and operations on other animals besides hogs.

It is also to be understood that the claims to follow are or will be intended to cover all of the generic and specific features of the invention herein described, and all statements of the scope of the invention which, as a matter of language, might be said to fall therebetween. Hence, the proper scope of the present general inventive concept should be determined only by the broadest interpretation of such claims so as to encompass all such modifications as well as all relationships equivalent to those illustrated in the drawings and described in the specification.

Finally, it will be appreciated that the purpose of the annexed Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. Accordingly, the Abstract is neither intended to define the invention or the application, which only is measured by the claims, nor is it intended to be limiting as to the scope of the invention in any way.

What is claimed is:

1. An animal carcass hair removal machine paddle apparatus comprising:
   a core of alternating layers of woven and non-woven fabrics pressed together and enveloped by an outer shell, said core being configured to have a first core end thicker than a second core end, lengthwise when pressed together;

wherein said core enveloped by said outer shell includes a first paddle end configured to be affixed to an end point of a star wheel, and a second paddle end, opposite said first paddle end, configured to have one or more metal cleats affixed to said second paddle end.

2. The apparatus of claim 1, wherein said core comprises: one or more layers of woven fabric arranged with a weft in a first direction and one or more layers of woven fabric arranged with a weft in a second direction.

3. The apparatus of claim 2, wherein one or more layers of woven fabric are arranged such that the direction of the weft is different than the direction of the weft of an adjacent layer of woven fabric.

4. The apparatus of claim 3, wherein one or more layers of woven fabric are arranged such that the direction of the weft is aligned with the direction of the weft of a non-adjacent layer of woven fabric.

5. The apparatus of claim 2, wherein said first direction is perpendicular to said second direction.

6. The apparatus of claim 1, wherein said core comprises: one or more layers of woven fabric arranged with a warp in a first direction and one or more layers of woven fabric arranged with a warp in a second direction.

7. The apparatus of claim 6, wherein one or more layers of woven fabric are arranged such that the direction of the warp is different than the direction of the warp of an adjacent layer of woven fabric.

8. The apparatus of claim 7, wherein one or more layers of woven fabric are arranged such that the direction of the warp is aligned with the direction of the warp of a non-adjacent layer of woven fabric.

9. The apparatus of claim 6, wherein said first direction is perpendicular to said second direction.

10. The apparatus of claim 1, wherein two or more layers of non-woven fabric are formed from a single, continuous sheet of non-woven fabric folded back over itself with a layer of woven fabric situated between each layer of folded non-woven fabric.

11. The apparatus of claim 1, wherein two or more layers of woven fabric are formed from a single, continuous sheet of woven fabric folded back over itself with a layer of non-woven fabric situated between each layer of folded woven fabric.

12. The apparatus of claim 1, wherein one or more layers extends less than a full distance from said first core end to said second core end.

13. The apparatus of claim 12, wherein at least one of said one or more layers that extends less than the full distance from said first core end to said second core end is shorter than a first adjacent layer and longer than a second adjacent layer.

14. The apparatus of claim 1, wherein the core is configured such that, when pressed together, the layers form a wave-like pattern in a cross-section of the length of the core layers.

15. A method of manufacturing an animal carcass hair removal machine paddle apparatus, the method comprising the steps of:
assembling alternating layers of woven and non-woven fabrics;
pressing said alternating layers together to form a core, the core having a first end thicker than a second end;
enveloping said core with an outer shell;
configuring said outer shell enveloped core to include a first paddle end capable of being affixed to an end point of a star wheel; and
configuring said outer shell enveloped core to include a second paddle end capable of having one or more metal cleats affixed to said second paddle end.

16. The method of claim 15, wherein said step of assembling alternating layers of woven and non-woven fabrics further comprises:
arranging a first one or more layers of woven fabric with a weft in a first direction; and
arranging a second one or more layers of woven fabric arranged with a weft in a second direction.

17. The method of claim 16, wherein said step of assembling alternating layers of woven and non-woven fabrics further comprises:
arranging one or more layers of woven fabric such that the direction of the weft is different than the direction of the weft of an adjacent layer of woven fabric.

18. The method of claim 17, wherein said step of assembling alternating layers of woven and non-woven fabrics further comprises:
arranging one or more layers of woven fabric such that the direction of the weft is aligned with the direction of the weft of a non-adjacent layer of woven fabric.

19. The method of claim 16, wherein said first direction is perpendicular to said second direction.

20. The method of claim 15, wherein said step of assembling alternating layers of woven and non-woven fabrics further comprises:
arranging a first one or more layers of woven fabric with a warp in a first direction; and
arranging a second one or more layers of woven fabric arranged with a warp in a second direction.

21. The method of claim 20, wherein said step of assembling alternating layers of woven and non-woven fabrics further comprises:
arranging one or more layers of woven fabric such that the direction of the warp is different than the direction of the warp of an adjacent layer of woven fabric.

22. The method of claim 21, wherein said step of assembling alternating layers of woven and non-woven fabrics further comprises:
arranging one or more layers of woven fabric such that the direction of the warp is aligned with the direction of the warp of a non-adjacent layer of woven fabric.

23. The method of claim 20, wherein said first direction is perpendicular to said second direction.

24. The method of claim 15, wherein said step of assembling alternating layers of woven and non-woven fabrics further comprises:
forming two or more layers of non-woven fabric from a single, continuous sheet of non-woven fabric folded back over itself with a layer of woven fabric situated between each layer of folded non-woven fabric.

25. The method of claim 15, wherein said step of assembling alternating layers of woven and non-woven fabrics further comprises:
forming two or more layers of woven fabric from a single, continuous sheet of woven fabric folded back over itself with a layer of non-woven fabric situated between each layer of folded woven fabric.

26. The method of claim 15, wherein said step of assembling alternating layers of woven and non-woven fabrics further comprises:
configuring one or more layers to span less than a full distance from said first core end to said second core end.

27. The method of claim 26, wherein said step of assembling alternating layers of woven and non-woven fabrics further comprises:

configuring at least one of said one or more layers that spans less than the full distance from said first core end to said second core end such that said at least one of said one or more layers is shorter than a first adjacent layer and longer than a second adjacent layer.

28. The method of claim 15, wherein said step of assembling alternating layers of woven and non-woven fabrics further comprises:

arranging said alternating layers such that, after the step of pressing said alternating layers together to form a core, the layers form a wave-like pattern in a cross-section of the length of the core layers.

\* \* \* \* \*